United States Patent

[11] 3,548,730

| [72] | Inventor | Jean Charles Verge |
| --- | --- | --- |
| | | Boulogne, France |
| [21] | Appl. No. | 782,526 |
| [22] | Filed | Dec. 10, 1968 |
| [45] | Patented | Dec. 22, 1970 |
| [73] | Assignee | Etablissement Public: Institut National De La Recherche Agronomique Paris, France a corporation of France |
| [32] | Priority | Dec. 19, 1967 |
| [33] | | France |
| [31] | | No. 132,789 |

[54] REFLEX CAMERA WITH BINOCULAR FOCUSING AND MICROPHOTOMETRIC CONTROL
5 Claims, 7 Drawing Figs.

[52] U.S. Cl. .................................................. 95/42, 95/11, 355/45
[51] Int. Cl. ......................................................G03b 19/12
[50] Field of Search............................................ 95/1, 11, 42; 355/44, 45

[56] References Cited
UNITED STATES PATENTS
2,540,351  2/1951  Rundell....................... 95/11

Primary Examiner—John M. Horan
Assistant Examiner—Richard L. Moser
Attorney—Melville, Strasser, Foster & Hoffman ABSTRACT: A multipurpose camera having all the advantages of previously known devices and intended essentially for microphotography and also for macrophotographic reproductions on emulsions ranging from the 24 × 36 mm. size to the 9 × 12 cm. size. The apparatus further comprises an observation and photographic recording system which permits not only convenient location of the interesting details of the preparation to be studied, but also the focusing of these details and their photometric analysis with binocular vision, without reference to the dial of a measuring apparatus outside the arrangement.

INVENTOR
JEAN CHARLES VERGÉ
BY MELLVILLE, STRASSER, FOSTER & HOFFMAN
ATTORNEYS

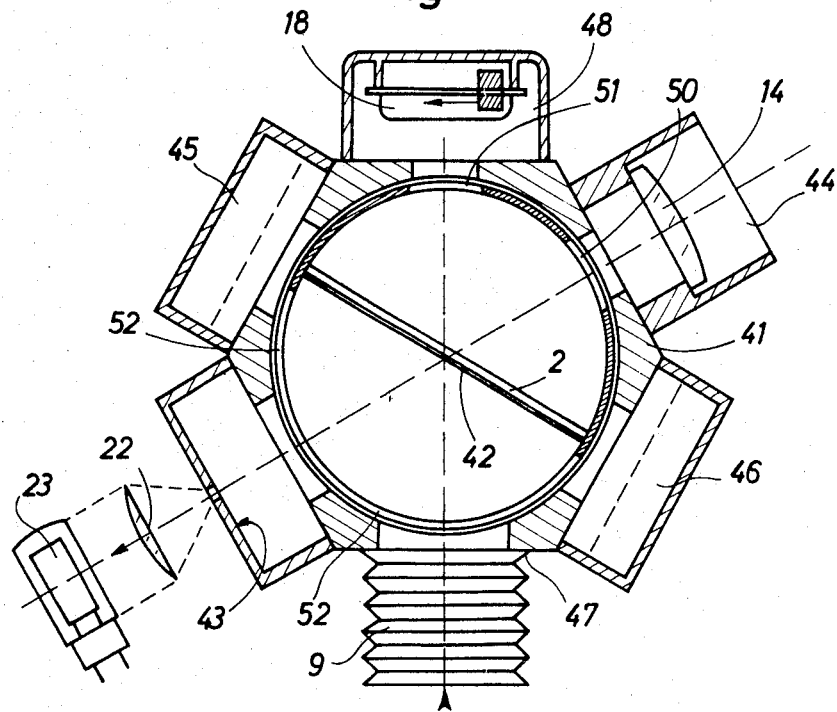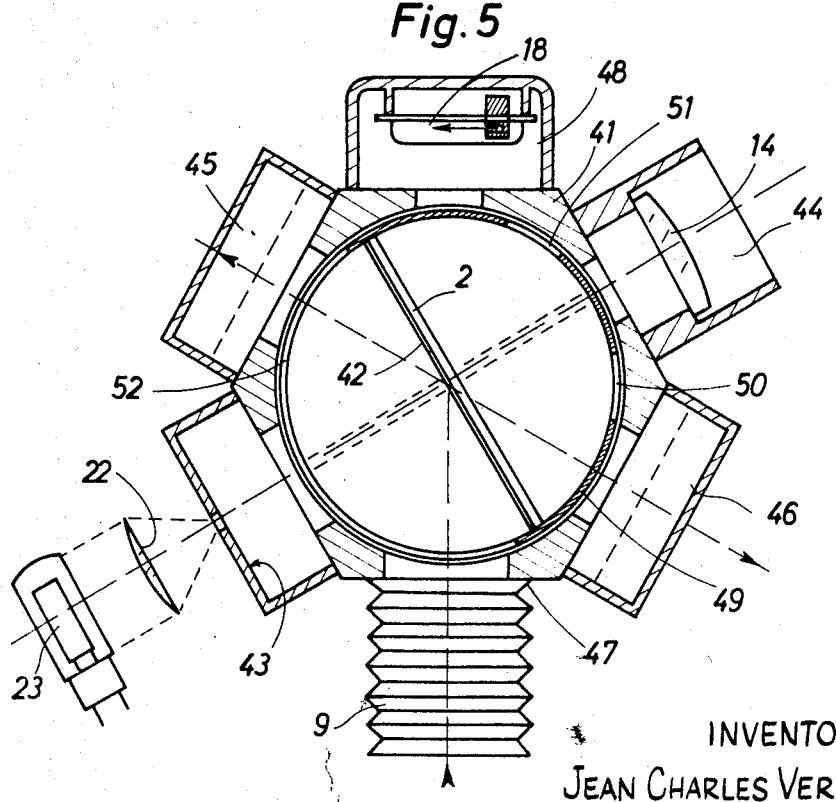

INVENTOR
JEAN CHARLES VERGÉ
BY MELVILLE, STRASSER, FOSTER & HOFFMAN
ATTORNEYS

3,548,730

REFLEX CAMERA WITH BINOCULAR FOCUSING AND MICROPHOTOMETRIC CONTROL

This invention relates to a universal reflex camera with binocular microphotometric control and focusing.

The camera forming the subject of the present invention has been designed and produced in order to meet a certain number of requirements which are inadequately met by equipment available at the present time, particularly in the fields of microphotography and macrophotography. As the result of the appearance of the 35 mm. film in microphotography, followed by the gradual abandonment of the traditional plate camera mounted on a column, in the last 25 years there has been witnessed the birth of various arrangements such as cameras fitting directly on the microscope tube, with an auxiliary viewing eyepiece, with or without a built-in exposure meter, microscopes with automatic photography in the tripod body (Zeiss photomicroscope), and cameras adapted to be fitted to microscopes and provided with compensated focusing at the binocular casing (Leitz Orthomat).

The disadvantage of these devices is that they comply only with very specific conditions of use.

In an article published in "Bulletin de Microscopie Appliquee," Vol. II, No. 4, issued in 1961, J. Grzelak and M. Lapierre, discussing a paper by C. Wm. Dradley published in 1960 in "Photographic Journal," emphasise the properties which an installation of this type must possess, namely versatility of use, rigidity of assembly, ability to dismantle and adapt, ability to use various sizes of film, ease of manufacture and vertical arrangement. It should be added that a camera of this type must permit simultaneous checking, by binocular vision, of the focusing and the readings of the exposure meter.

It is common knowledge that the image of a microscopic field examined by projection on a matt white screen is superior in fineness to the image obtained through a ground glass screen, the grain of which introduces diffusion, which is not favourable to the viewing of fine details. The idea of equipping a camera with a projection screen replacing the sensitive surface is not new. In 1866, in his work "La Photographie appliequee aux recherches micrographiques," describing various microphotographic installations Moitessier mentions an arrangement of this kind which makes it possible for the image formed in the bottom of the camera to be seen by means of a side window.

It is moreover noted that since that time cameras utilising this system of focusing have been built in vertical and horizontal versions. With regard to the latter arrangements, constituted by a long extension horizontal camera associated with a vertical microscope by means of prism reflection, Moitessier provides for the use of a lateral viewing field glass giving 3 x magnification, intended for focusing in the case of long extensions of the bellows. The camera of Grzelak and Lapierre provides a judicious adaptation of this arrangement by means of a bent field glass for focusing on a retractable screen situated in the plane of the sensitive surface.

In their apparatus the change of film size is obtained by means of a slide carrying both the end of the bellows of the main camera and a 35 mm. miniature camera equipped with its own viewing eyepiece.

Another arrangement, produced by Mr. Martin in the microphotography laboratory of the Institut de Recherches sur le Cancer, utilises the properties of a 50 percent semitransparent articulated plate reflecting part of the light beam to the emulsion, the other fraction being transmitted to the photoelectric cell of an automatic exposure meter. When the plate is replaced by a 100 percent aluminised mirror, focusing is effected with full light by means of a viewing eyepiece.

The aim of the invention is to provide a multipurpose camera having all the advantages of previously known devices and intended essentially for microphotography and also for macrophotographic reproductions on emulsions ranging from the 24 × 36 mm. size to the 9 × 12 cm. size, for example.

Another object of the invention is to provide an apparatus comprising an observation and photographic recording system which permits not only convenient location of the interesting details of the preparation to be studied, but also the focusing of these details and their photometric analysis with binocular vision, without reference to the dial of a measuring apparatus outside the arrangement.

The apparatus forming the object of the invention comprises: a camera of polygonal section having an even number of sides and provided with a circular collar at its base and a circular aperture at its top, in which collar and aperture a cylindrical tube is adapted to turn which contains a semitransparent plate inclined at 45° in relation to the axis of said tube between two diametrally opposite apertures formed in the latter; by rotation of the tube said plate can be brought opposite windows provided in the walls of said camera on at least two diametral axes capable of passing through said plate substantially at its centre, one of said axes passing on one side of the camera through a viewing system comprising a viewer and an adjustable lens permitting binocular vision, and, on the other side of the camera, through the centre of a screen for the projection of images reflected by said plate and originating from the tube of a microscope or similar apparatus connected by a bellows to the bottom collar of said camera, said screen having in its centre a calibrated aperture behind which a photoelectric cell is situated, while the other axis passing through the plate and camera coincides on one side of the latter with the axis of a frame carrying a photographic emulsion, and on the other side with the axis of a second frame or adapter carrying another photographic emulsion of a different size from that of the first emulsion.

The calibrated aperture situated in front of the photoelectric cell is formed by a series of openings of different diameters disposed circularly in a rotary disc constituting a part of the screen, the axis of rotation of said disc being situated on the screen in such a manner that in the course of this rotation all the openings of the disc can be brought in succession to the axis passing through the plate and the camera and coinciding substantially with the axis of said photoelectric cell.

When the camera is of square section the galvanometric equipment is situated on the screen side and the dial of the measuring apparatus is placed below the disc provided with calibrated apertures, so that the window provided in the wall of the camera shows only the graduation and the end of the needle of said apparatus.

When the chamber is of hexagonal section, the axis of the cylinder containing the plate is the axis of symmetry of the system and the plate may be traversed by three axes, the first of which passes through the viewing system and the centre of the projection screen, the second passing through the frames carrying photographic emulsions of different sizes, and the third coinciding with the axis of the tube of the microscope or other similar examination apparatus and passing through the dial of the measuring apparatus, the walls of the camera being provided, on its six faces, with windows corresponding to the three positions occupied by the plate, an opening in the internal plate carrier cylinder, on the screen side, extending over an arc of 160° approximately and two other orifices in the cylinder, giving an aperture of from 20° to 25°, having their axes at 60° symmetrically in relation to the normal of the plate.

In its applications the camera is mounted in a platform sliding along columns and operated independently of a second platform carrying the end of the bellows and optionally the shutter and a baffle joint intended for the microscope or for the macrophotography lenses.

A form of construction of a photographic camera constructed in accordance with the invention is described below, simply by way of example and without limitation, with reference to the accompanying drawings, in which:

FIG. 4 illustrates in cross section an alternative construction of the apparatus, the plate being in the focusing and measuring position;

FIG. 5 is a similar section with the plate in the position for printing on an emulsion;

Figure 1:
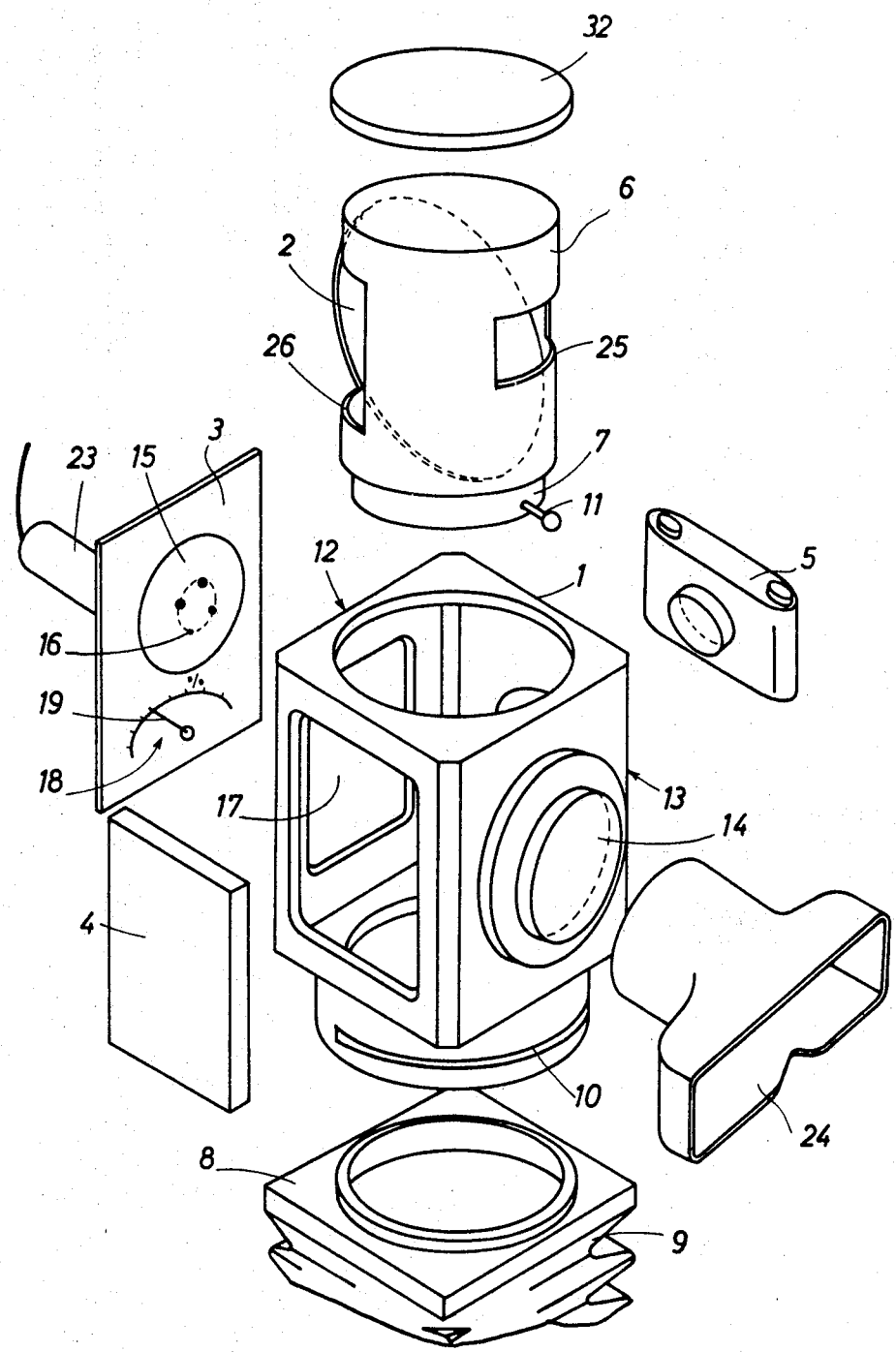
FIG. 1 shows the camera in perspective in the form of an exploded view.

The apparatus comprises a camera body 1 of cubic shape and constituted by a light alloy casting, containing an aluminised separator plate 2 giving 50 percent reflection, inclined at 45° in relation to the optical axis, and adapted to move about said axis. The purpose of this semitransparent plate 2 is to displace the beam coming from the microscope either towards a matt white screen 3 serving for focusing as well as for photometrical analysis, or to one of the emulsions of different sizes which are situated at 4 and 5. The plate 2 is contained in a cylinder 6, the bottom portion 7 of which is rotatably engaged in a plate 8 receiving both the base of the camera chamber and the top portion of the bellows 9. The bottom portion of the camera body is cut out or slit at 10 and permits the passage of an external lever 11 permitting the operations of directing the cylinder 6 and the plate 2. The faces 12 and 13 of the chamber, which are situated at right angles to those intended for the frames or casings for the emulsions, receive in one case (13), facing the viewer, an adjustable lens 14 of large diameter permitting binocular examination, and in the other case (12), opposite thereto, the focusing screen 3 constituted by the dial of a measuring apparatus modified to receive in its thickness a movable disc 15 provided with calibrated apertures, such as 16, on its periphery. The arrangement of the disc is such that each aperture is situated at the meeting point of the diagonals of the window 17 of the screen; the dial therefore serves at the same time as a projection screen and as a measuring apparatus based on the deflection of the galvanometric equipment 18 (FIGS. 1 and 2), at the bottom of the window, only the reading scale being visible, as well as the end of the needle 19.

Each aperture 16 is brought into position by means of external control by the lever 20, positioning being effected by a ball or click system 21, and each aperture 16 displaced in the middle of the window is automatically positioned at the focus of an achromatic lens 22 situated in front of a photoelectric cell or photomultiplier 23. The screen is thus examined through the semialuminised plate 2 and in accordance with an illumination intensity representing about 25 percent of that of the original beam; the observer's view is protected from parasitic light by means of a viewer 24 intended to enclose the face.

The successive positions of the cylinder 6 carrying the semitransparent plate 2 are obtained by means of the lever 11 and marked by a ball and spring system at the three stops after rotation through 180°. The cylinder 6 is provided with apertures 25 and 26 to permit viewing by the observer, while reflecting the beam originating from the bellows 9 to the projection screen 3 and the various emulsions; in the latter case, the aforesaid apertures are retracted through the design and no external parasitic light can penetrate into the camera 1 when the cylinder 6 is directed to the 180° sweep end positions corresponding to the direction of the plate 2 for the purpose of photography on one emulsion or the other. A cover 27 closing the camera body 1 completes the absolute tightness of the latter.

Figure 2:
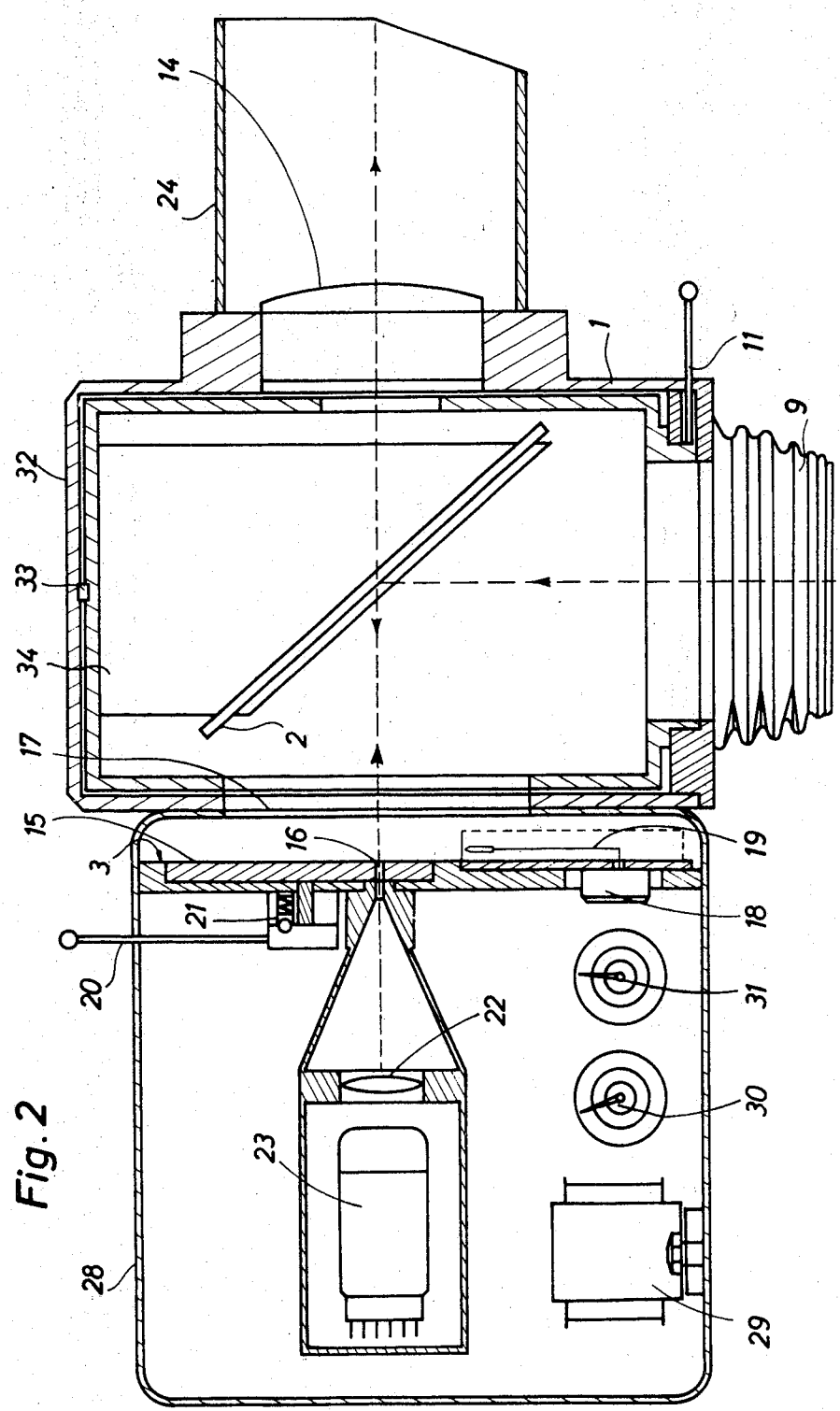
FIG. 2 is a longitudinal section of the entire apparatus.

FIG. 2 illustrates in section the mounting of the photometric unit incorporated in the camera. This unit comprises a case 28 containing the projection screen 3. The disc 15 provided with holes 16 over a sector of 180° is made movable by means of the lever 20 passing through a slot in the case. The system for focusing the image of the aperture selected contains the achromatic lens 22 and the cell or photomultiplier 23.

The electricity supply and electronic equipment are accommodated at 29 in the case 28. A darkness current compensation button 30 (point O of the scale) and a 100 percent adjustment button 31 are fixed on the walls of the case.

At the top the camera 1 is closed by a lid 32 provided with an internal nipple 33 effecting the centring of the internal cylinder 6 and also the mode. The semitransparent plate 2 is fixed between two cheeks 34 on the roof of the cylinder.

Figure 3:
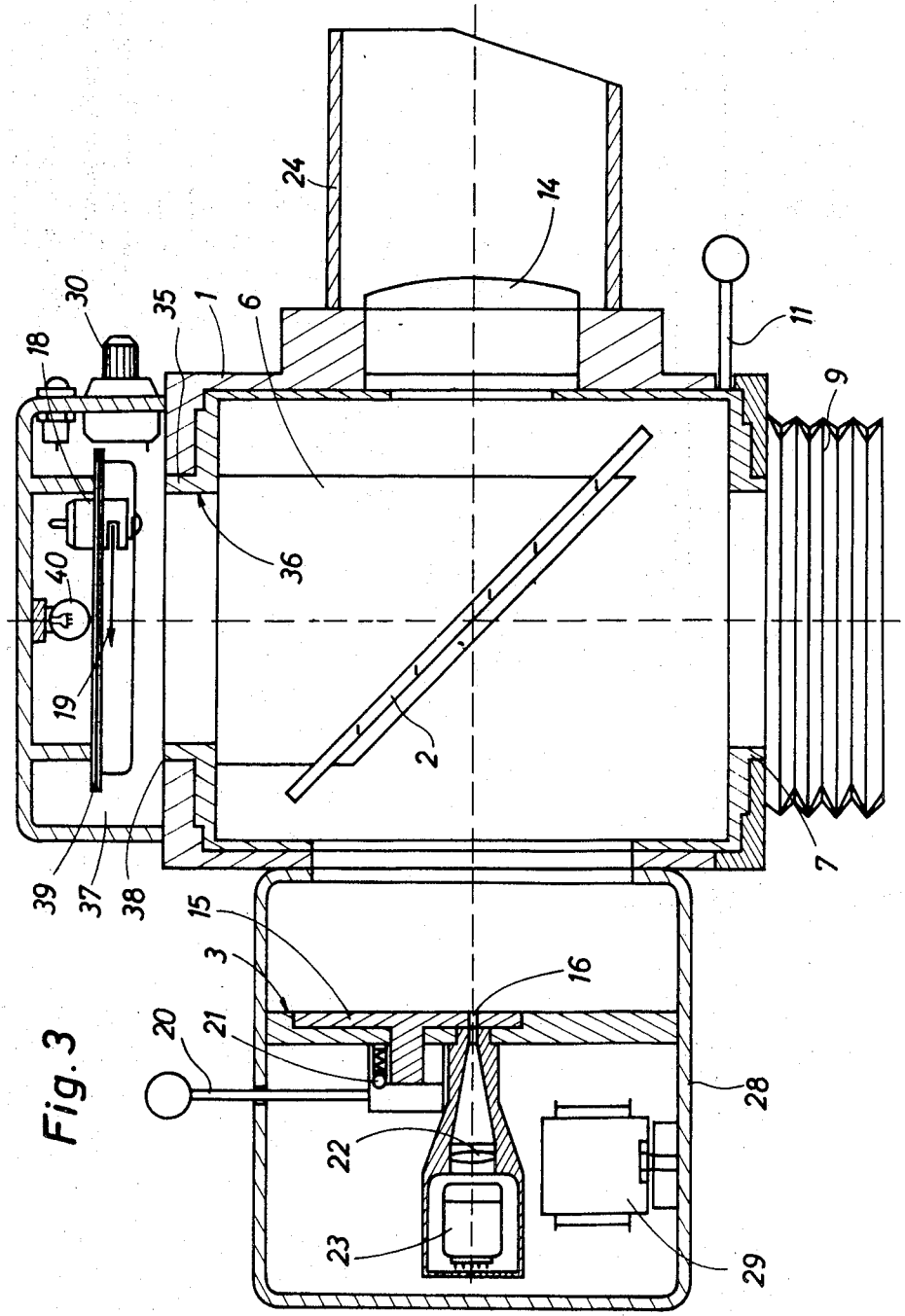
FIG. 3 illustrates an alternative arrangement of the measuring device.

FIG. 3 illustrates a modified arrangement permitting focusing on the screen 3 without being hampered by the presence of the measuring apparatus 18 in the bottom of the window 17. In this case the lid closing the internal cylinder 6, which was described previously, is replaced by a crown 35 the bore 36 of which leads into an auxiliary chamber 37 containing the measuring apparatus 18 in the horizontal position. The plate carrier cylinder 6 is mounted rotatably at its two ends at 7 and at 38. The dial 39 of the measuring apparatus can be illuminated by reflection or by transparency by means of a lamp 40, the intensity of which can be adjusted with the aid of a control situated on the same case and within reach of the observer, at the same time as the buttons 30 and 31 for darkness current compensation and 100 percent scale adjustment. The case 28 of the photometric unit then contains only the electric supply and amplification system 29, although this system may also be accommodated in the top part of the chamber 37 containing the measuring apparatus 18. By means of this arrangement the observer can adjust the contrast of illumination of the measuring scale in relation to the luminosity of the projection field observed by transmission through the plate 2, by means of the reflection of the dial obtained on the back face of said plate. For this purpose the engraving of the dial 39 is obviously reversed, which is also true of the direction of deflection of the needle 19 in order to take into account observation by single reflection.

FIG. 4 illustrates an alternative mounting of the semitransparent plate 2. In this arrangement the plate is not mounted on a support giving it a constant inclination of 45° in relation to the optical axis coinciding with the axis of rotation; the axis of rotation now passes through the reflection plane of the plate and the camera body 41 has a polygonal (hexagonal) contour in the example illustrated. The axis 42 carrying the plate 2 is the axis of symmetry of the system and each face is occupied by the devices described above, namely the projection screen at 43, the viewing device at 44, one of the emulsion carrier frames 45, the other frame or adapter at 46, the bellows connection at 47, and the measuring apparatus case at 48. The separator blade 2 is likewise contained in a cylinder 49 provided with apertures 50 and 51 with a large cutout at 52.

FIG. 4 illustrates the arrangement of the rays in the case of the examination of the screen by means of the lens 14. It is seen that the apertures 50 and 51, which were covered by the camera body when they were made to coincide with the angles of the hexagonal profile of the latter, are in this case in positions corresponding to the faces 44 and 48. It is therefore possible to effect focusing on the matt screen with the juxtaposition, in the field of vision, of the image of the dial of the measuring apparatus 18, which is observed by reflection on the back face of the plate 2, this remaining unchanged.

FIG. 5 illustrates the arrangement of the beams originating from the bellows 9; they are reflected at 120° to the emulsion situated at 45 in the position of the plate where it forms an angle of 60° with the optical axis (solid lines) and at 60° towards the emulsion situated at 46 when the position of the plate (shown in broken lines) forms an angle of 30° with the axis of the apparatus.

Figure 7:
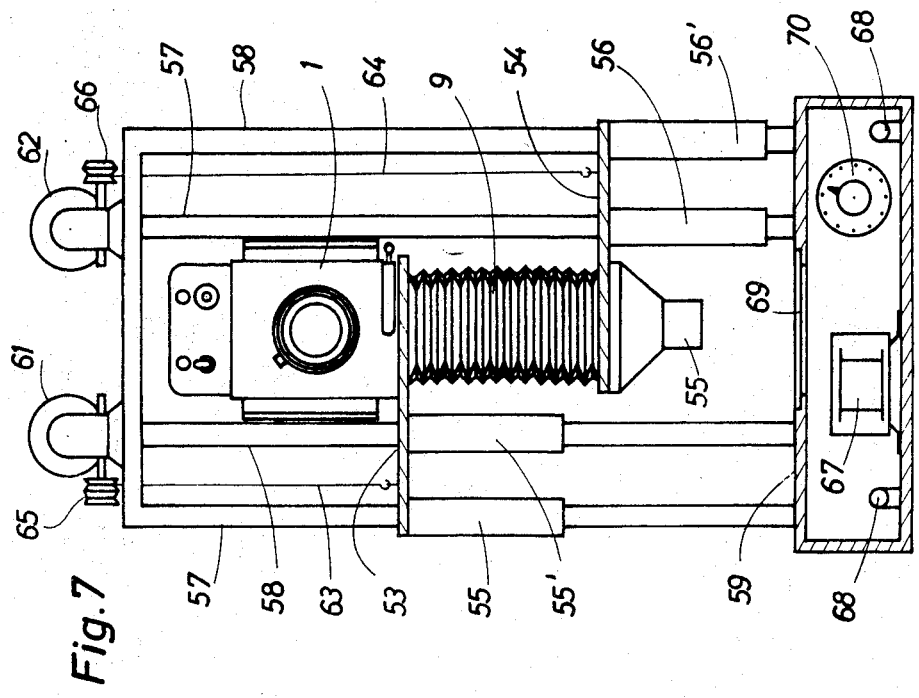
FIGS. 6 and 7 illustrate an example of mounting of the apparatus on a support intended for microphotography and macrophotography operations.
Figure 6:
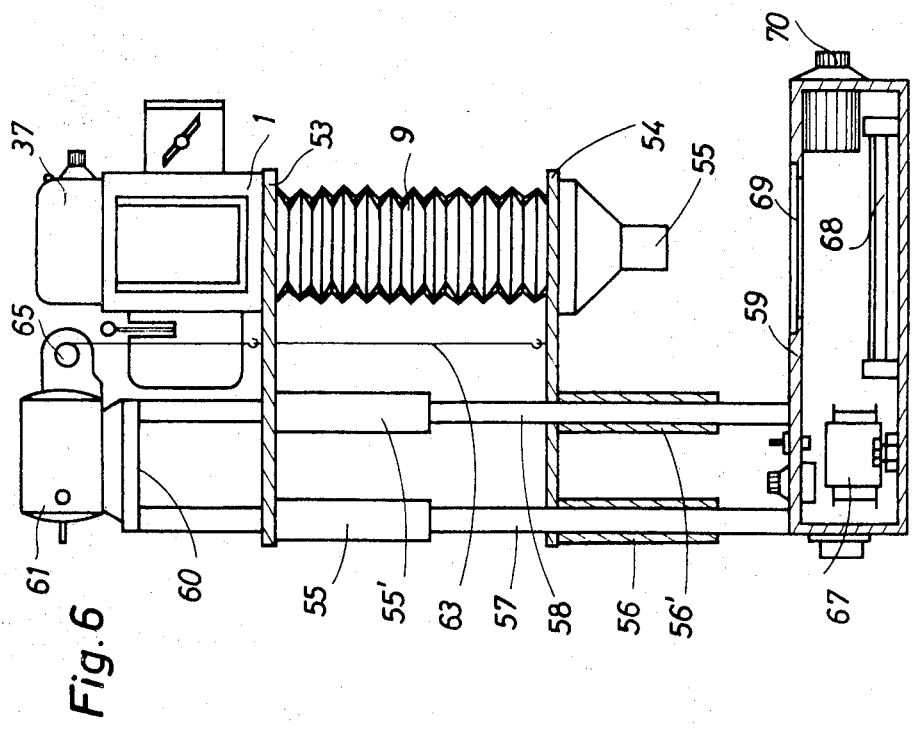

FIGS. 6 and 7 illustrate an arrangement of the mounting of the apparatus on a support intended for microphotography and macrophotography operations.

The camera body 1 is fixed on a plate 53 connected to the top of a bellows 9; the bottom of the latter is fixed on an identical plate 54 carrying the shutter 55 with the baffle joint intended for the microscope or macrophotography lenses. Each of the plates 53 and 54 is provided with a pair of tubes 55, 55' and 56, 56' forming casings provided internally with rings of "teflon" or any other antifriction substance. The whole arrangement is mounted for sliding along tubular uprights 57 and 58 screwed on a box 59 of moulded light alloy, in a trapezoidal quadrangular arrangement. A bracing plate at 60 connects the top ends of the uprights 57 and 58 in order thus to form a rigid column along which the supports 53 and 54 of the camera and shutter slide on each pair of lateral uprights. The movements of the camera 1 and of the bottom part of the bellows 9 are independent and controlled by two reversible, variable speed electric motors 61 and 62 which are mounted on the end plate 60 of the column, with automatic end-of-travel limitation. The solution adopted comprises drive by metal cables 63 and 64 wound over helicoidally grooved pulleys 65 and 66 with a speed reducer.

The base of the mounting constituted by the box 59 of cast light alloy contains the mains current supply and also the low voltage circuit 67 intended for the illumination of the microscope and also the circuits for supplying the exposure meter 37 of the camera. Voltage and current are read on instruments flush-mounted in the platform 59 with adjustment by means of alternostats or equivalent devices 70. Finally, lighting by means of fluorescent tubes or bulbs 68 permits illumination of a rectangular or circular window 69 cut in the platform in order to form a light box. A lid forming a positioning element provided with reference marks is used for positioning removable elements, such as a microscope.

The mode of utilisation of the apparatus, for example for microphotography, is very simple.

The observer turns the internal cylinder 6 of the camera 1 in such a manner as to unmask the screen 3, which can be observed through the semitransparent plate 2. The microscopic field is explored directly thereon and a suitable calibrated aperture 16 is presented at the centre of the projection window 17. The total range of the scale (100 percent) is adjusted by means of the variable sensitivity switch 31 by acting additionally on the lighting adjustment, outside a region occupied by the preparation (white).

The darkest detail of the field is brought to the aperture (percent of transmission read), and the exposure time dependent on these two factors, the nature of the filter used and the sensitivity of the emulsion, is determined.

In these operations convenient contrast is obtained between the scale of the measuring apparatus and the microscopic field by adjusting the rheostat of the lamp 40 illuminating the dial 39. After extinction of the illumination of the dial, the separator plate 2 is directed towards the selected emulsion 4 or 5, and the focusing optical path is masked. The shutter, which had been closed, is released again; but it is possible to provide independent shutters in positions corresponding to the emulsions in order to avoid the closure of the shutter 55 situated at the bottom of the bellows 9 when each shot is made. Focusing conditions are excellent because of the equality of the optical paths corresponding to the various directions of the reflecting plate 2; a special feature of the device is the obtaining of reversed images, which a similar projection or enlarging device restores to their normal appearance.

The use of the apparatus is not limited to photography; the observation system may be used in microphotometry by the Lison method, for measurements of microreflectance, with all the advantages of conveniently incorporated photographic recording. In a general way the camera may be mounted on various laboratory devices.

Modifications of form and detail may obviously be made to the apparatus described above simply by way of example without limitation, without thereby departing from the spirit of the invention.

I claim:

1. A reflex photographic camera with binocular focusing and microphotographic control, comprising a camera body of polygonal cross section having an even number of sides, a rotatable optical reflection system which is mounted in the camera body and of which the reflecting surface is rotatable into positions facing windows formed in the walls of said camera body on at least two diametral axes passing through said rotatable system substantially at its centre, the said rotatable system incorporating a semitransparent plate inclined at 45° and a cylindrical tube carrying said semitransparent plate and mounted rotatably in said camera body, a photoelectric cell mounted outwardly of one of said windows, a viewing system arranged on one of said diametral axes and on one side of said camera body and incorporating a viewer and an adjustable lens of binocular viewing dimensions, a projection screen lying on the same diametral axis but on the other side of said camera body in a position to show images reflected by said plate, and a bellows attached to said camera body and surrounding an aperture therein, said screen having at its centre a calibrated aperture behind which is situated a photoelectric cell, and a second of said diametral axis that pass through said rotatable system and camera body coinciding, on one side of the latter, with the axis of a first photographic emulsion carrying assembly, and, on the other side, with the axis of a second photographic emulsion carrying assembly, the latter being of a different size from that of the first emulsion carrying assembly.

2. A camera as claimed in claim 1, wherein the calibrated aperture of said projection screen is afforded by a series of apertures of different diameters, disposed circularly in a rotatable disc forming part of the screen, the axis of rotation of the disc being disposed in a position that enables all the openings in the disc to be brought in succession to that diametral axis which substantially coincides with the axis of said photoelectric cell.

3. A camera as claimed in claim 2, wherein the camera body is of square cross section, and wherein a galvanometer assembly is associated with the photoelectric cell and is situated adjacent the screen, the dial of the said adjacent assembly being disposed below the apertured disc at a height that enables the graduations and the end of the needle of said galvanometer assembly to be seen through the adjacent window in the wall of the camera body.

4. A camera as claimed in claim 2, wherein the camera body is of hexagonal cross section, the axis of rotation of the semitransparent plate is the axis of symmetry of the camera body, and three diametral axes pass through the said plate, the first diametral axis passing through the viewing system and the centre of the projection screen, the second diametral axis passing through the photographic emulsion carrying assemblies of different sizes, and the third diametral axis coinciding with the axis of the said bellows attachment and passing through the dial of a galvanometer assembly, the six walls of the camera body surrounding its axis of symmetry being provided with windows corresponding to the three positions of the semitransparent plate, and the said cylindrical tube having three windows cooperating therewith, these comprising a window on the screen side giving an aperture of about 160°, and two windows adjacent thereto giving an aperture of from 20° to 25° and placed 60° from one another symmetrically in relation to the diameter passing through the centre of the large window.

5. A camera as claimed in claim 1, wherein the camera body is mounted on a first platform sliding on columns and a second but independently operated platform carries the bellows end assembly remote from the camera body.